United States Patent [19]

Engel

[11] Patent Number: 5,201,257
[45] Date of Patent: Apr. 13, 1993

[54] FOLDING LUG WRENCH

[75] Inventor: Darryl L. Engel, LaOtto, Ind.

[73] Assignee: Universal Tool & Stamping Co., Inc., Butler, Ind.

[21] Appl. No.: 819,835

[22] Filed: Jan. 13, 1992

[51] Int. Cl.$^5$ .............................................. B25B 23/16
[52] U.S. Cl. ...................................... 81/177.6; 7/100; 7/138
[58] Field of Search ................ 81/177.6, 177.7; 7/100, 7/138

[56] References Cited

U.S. PATENT DOCUMENTS 1,442,174  1/1923  Oberjohann .................... 81/177.6 X
4,607,406  8/1986  Davis ............................ 81/177.6 X
4,733,583  3/1988  Lewis ........................... 81/177.6 X

FOREIGN PATENT DOCUMENTS 1496524  12/1977  United Kingdom ............... 81/177.6

Primary Examiner—James G. Smith
Attorney, Agent, or Firm—Hill, Steadman & Simpson

[57] ABSTRACT

A folding lug wrench for removing lug nuts and for operating a jack. A hot forged stub socket is pivotally attached to a handle with a yoke which substantially distributes out the torque forces over large areas which results in an increased torque capacity for the wrench. When the wrench is not in use, it can be pivoted and stored in the handle and held by a projection.

4 Claims, 1 Drawing Sheet

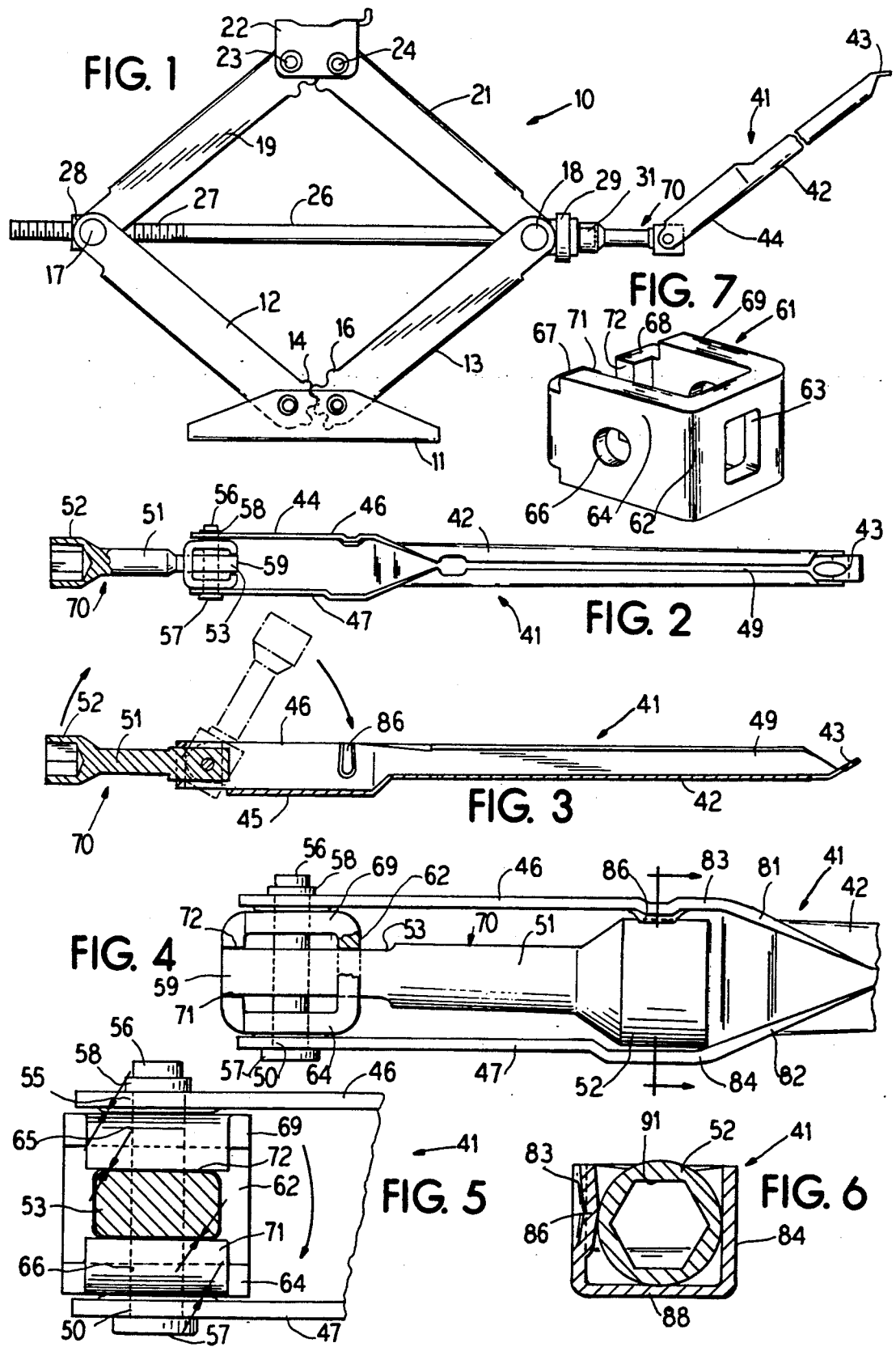

FOLDING LUG WRENCH

BACKGROUND OF THE INVENTION

1. Field of the Invention

This invention relates in general to lug wrenches and, in particular, to a novel folding lug wrench which utilizes a hot forged stub socket.

2. Description of Related Art

Prior art lug wrenches have been of two forms, one, solid one-piece hot forged types or folding types. Lug wrenches are made of hot carbon steel which is very tough. This gives hot forged lug wrenches the advantage of being able to withstand a large amount of abuse without being damaged. The disadvantage of prior art lug wrenches is that they do not function well to operate the car jack. In recent years, there has been a trend to use the lug wrench for lug nut removal and to operate the jack. This eliminates the need of the jack having an attached handle which results in weight and cost savings. The prior art lug wrench is made from a stamped handle and a length of hex tubing. The two pieces are held together with a rivet which provides the pivot for the hex tube so that it can fold into the handle. The folding lug wrench's advantage is that it can be used to remove lug nuts and also to operate the jack. The disadvantages are that the hex tube will deform because the sides will round out or the tube will split when it is over-torqued thus rendering it unusable. Lug wrenches are subject to a great amount of abuse.

SUMMARY OF THE INVENTION

The present invention comprises an improved folding lug wrench which uses a stamped handle and a hot forged stub socket. Thus, the hot forged stub socket will not deform as do prior art hex tubes due to an improved wrench results. A second improvement in the folding lug wrench of the invention is to provide a yoke which fits between the hot forged stub socket and the handle. The yoke is bent into a configuration such that it has opposite sides which contact the flats of the stub socket such that the yoke spreads the torque forces over a larger area than lug wrenches of the prior art so as to increase the torque capacity over prior art wrenches which use the hex tube.

An additional feature of the present invention is to provide a wedge-shaped bump in the side of the handle so as to lock the pivoted hot forged stub socket when it is stored in the handle of the wrench thus eliminating potential sources of rattling.

It is an object of the present invention to provide an improved folding lug wrench which has a hot forged stub socket which is stronger than prior art hex tubes and also to provide a novel yoke for connecting the hot forge stub wrench to the handle so as to increase the torque that can be applied between the handle and the wrench. Also, a locking means is provided so as to lock the wrench in the stored position within the confines of the handle so as to prevent rattles.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side plan view of the novel folding lug wrench of the invention in use with a jack;

FIG. 2 is a top plan view of the folding lug wrench;

FIG. 3 is a sectional side view of the wrench;

FIG. 4 is an enlarged detail view illustrating the stored position of the wrench;

FIG. 5 is a cut-away illustrating the yoke of the invention;

FIG. 6 is a sectional view illustrating the locking means of the invention; and

FIG. 7 is a perspective view of the locking yoke of the invention.

DETAILED DESCRIPTION OF THE PREFERRED EMBODIMENTS

FIG. 1 illustrates a scissors type jack 10 which has a base 11 with lower pivoted arms 12 and 13 that are pivotally attached to the base 11 and which have teeth 14 and 16 that mesh. Upper pivot arms 19 and 21 are pivotally connected by pivot pins 17 and 18 to lower arms 12 and 13 and an upper support 22 is connected by pivot pins 23 and 24 to upper pivot arms 19 and 21. A shaft 26 has a threaded portion 27 which is threadedly received in a threaded collar 28 that is connected to pivot pin 17. Shaft 26 passes through a collar 29 which is connected to pivot pin 18 and has a hexagonal extending portion 31 that can be engaged with a lug wrench 41. The lug wrench 41 comprises the present invention and comprises a stamped handle 42 which is folded to conform to the shape illustrated in FIGS. 1, 2, 3 and 4 and which has a bottom socket 42 and upwardly extending sides which form a rib 49. One end is formed with a sharp extending portion 43 so as to remove the wheel covers from wheels, for example. The other end is formed with a wrench receiving socket 44 which is formed with sidewalls 46 and 47 and a bottom 45 as illustrated. A pivot pin 57 extends through openings 50 and 55 formed in the sidewalls 47 and 46 and a washer 58 passes over the end of the pin 56 which is enlarged so as to lock the washer 58 on the pin. A yoke 61 is formed with a first side 62 formed with an opening 63 through which the flatted portion 59 of a lug wrench 70 extends. Joined to side 62 is a first sidewall 64 formed with an opening 66 through which pin 57 extends. A second sidewall 69 joins the other edge of side 62 and is formed with an opening 57 through which the pin 66 extends as shown in FIG. 4. A portion 67 is bent inwardly from side 64 toward the flatted portion 59 of the lug wrench 70 and the end of portion 71 engages the sidewall of the lug wrench 70. Inwardly extending portion 72 extends from sidewall 69 and engages the flatted portion 59 of lug wrench 70 as shown in FIG. 4.

A round portion 51 of wrench 70 joins the flatted portion 59 at junction 53 of the lug wrench 70 and terminates in a hexagonal opening 91 which has a size so as to fit over wheel lugs, for example. An enlarged socket is formed by sidewalls 83 and 84 in the handle 41 and an inwardly extending bump or projection 86 engages the head 52 of lug wrench 70 when it is in the folded position illustrated in FIGS. 4 and 6.

The lug wrench 70 is formed of high carbon steel so that it will be very tough. The lug wrench of the invention is capable of withstanding and exerting much more torque than the hex tube wrenches of the prior art.

The yoke 61 substantially increases the strength of the folding lug wrench of the invention in that as shown in FIG. 5, the yoke distributes the turning torque illustrated by the arrow over much greater surface areas than would occur without the yoke 61. Thus, the sides of the opening 63 and the ends of members 71 and 72 which engage the flatted portion 53 of the lug wrench 70 distribute the torque forces as illustrated in FIG. 5.

FIG. 1 illustrates the lug wrench in use operating a jack wherein the hexagonal head 52 of the lug wrench 70 is fitted over the extending hexagonal portion 31 of the jack so as to turn the shaft 26 to raise and/or lower the jack. The handle portion 42 can be pivoted on pin 57 so as to exert torque on the lug wrench 70 as shown in FIG. 1.

So as to store the lug wrench 70 in the handle, the lug wrench 70 is pivoted as shown in dash-dot line in FIG. 3 until the head 52 engages the projection 86 which locks the wrench 70 to the handle in the position shown in FIGS. 4 and 6. The projection 86 tightly holds the wrench 70 so that it will not rattle when the wrench is stored, for example.

Although the invention has been described with respect to preferred embodiments, it is not to be so limited as changes and modifications can be made which are within the full intended scope of the invention as defined by the appended claims.

We claim as our invention:

1. A folding lug wrench comprising, a stamped handle (42) which is formed with a lug wrench receiving socket (44) at one end which has sidewalls (46, 47) which are formed with first openings (50, 55) a pivot pin (57) which extends through said first and second and second openings (50, 55) in said sidewalls (46, 47), a lug wrench (70) with a hexagonal opening (91) in one end thereof, and formed with a flatted portion (53) at its other end through which a third opening extends in a direction normal to a plane of the flatted portion, a yoke (61) formed with a first side (62) that has a fourth opening (63) through which said flatted portion (63) of said lug wrench extends, a pair of sidewalls (64, 69) attached to said first side (62) and formed with fifth and sixth openings (66) through which said pivot pin (57) extends and said pair of sidewalls (64, 69) of said yoke (61) are respectively mounted between said sidewalls (46, 47) of said wrench receiving socket (44) and said flatted portion (53) of said lug wrench (70).

2. A folding lug wrench according to claim 1 wherein said yoke has a first inwardly extending portion (67) with an end (71) that engages said flatted portion (53) of said lug wrench (70) and a second inwardly extending portion (68) with an end (72) that engages said flatted portion (53).

3. A folding lug wrench according to claim 1 wherein sad lug wrench receiving socket is formed with a detent for locking said lug wrench in said socket.

4. A folding lug wrench according to claim 3 wherein said detent comprises a projection formed on said handle in said lug wrench receiving socket.

* * * * *